(12) United States Patent
Geigel

(10) Patent No.: US 8,769,688 B2
(45) Date of Patent: Jul. 1, 2014

(54) SIMULTANEOUS DETERMINATION OF A COMPUTER LOCATION AND USER IDENTIFICATION

(75) Inventor: Arturo Geigel, San Juan, PR (US)

(73) Assignee: Universidad Politécnica de P.R., Hato Rey, PR (US)

( * ) Notice: Subject to any disclaimer, the term of this patent is extended or adjusted under 35 U.S.C. 154(b) by 0 days.

(21) Appl. No.: 13/243,913

(22) Filed: Sep. 23, 2011

(65) Prior Publication Data

US 2013/0081137 A1    Mar. 28, 2013

(51) Int. Cl.
*G06F 11/00* (2006.01)
(52) U.S. Cl.
USPC ............................................................ 726/23
(58) Field of Classification Search
USPC ............................................................ 726/23
See application file for complete search history.

(56) References Cited

U.S. PATENT DOCUMENTS

| 5,557,742 | A  | * | 9/1996  | Smaha et al. ................... 726/22 |
| 7,295,119 | B2 | * | 11/2007 | Rappaport et al. ......... 340/572.4 |
| 7,971,251 | B2 | * | 6/2011  | Sinha ............................... 726/23 |
| 2003/0217289 | A1 | * | 11/2003 | Ammon et al. ............... 713/201 |
| 2004/0137915 | A1 | * | 7/2004  | Diener et al. ............... 455/456.1 |
| 2004/0212500 | A1 | * | 10/2004 | Stilp ............................... 340/541 |
| 2005/0055568 | A1 | * | 3/2005  | Agrawala et al. ............. 713/200 |
| 2005/0128989 | A1 | * | 6/2005  | Bhagwat et al. ............... 370/338 |
| 2006/0058062 | A1 | * | 3/2006  | Bhagwat et al. ........... 455/553.1 |
| 2006/0070113 | A1 | * | 3/2006  | Bhagwat et al. .................. 726/2 |
| 2006/0274684 | A1 | * | 12/2006 | Diener .......................... 370/318 |
| 2006/0281473 | A1 | * | 12/2006 | Debany et al. ............. 455/456.2 |
| 2007/0132846 | A1 | * | 6/2007  | Broad et al. ................. 348/143 |
| 2008/0094190 | A1 | * | 4/2008  | Okada ...................... 340/426.24 |
| 2008/0109879 | A1 | * | 5/2008  | Bhagwat et al. .................. 726/3 |
| 2008/0119130 | A1 | * | 5/2008  | Sinha ............................... 455/1 |
| 2008/0244707 | A1 | * | 10/2008 | Bowser et al. .................... 726/4 |
| 2009/0125981 | A1 | * | 5/2009  | Krischer et al. .................. 726/3 |
| 2009/0274060 | A1 | * | 11/2009 | Taylor ........................... 370/252 |
| 2009/0303042 | A1 | * | 12/2009 | Song et al. ..................... 340/566 |
| 2010/0013933 | A1 | * | 1/2010  | Broad ............................ 348/159 |
| 2010/0132040 | A1 | * | 5/2010  | Bhagwat et al. ................. 726/23 |
| 2011/0063110 | A1 | * | 3/2011  | Habib et al. ................... 340/552 |
| 2011/0149078 | A1 | * | 6/2011  | Fan et al. ....................... 348/152 |
| 2011/0230171 | A1 | * | 9/2011  | Kasper ....................... 455/414.1 |
| 2012/0025849 | A1 | * | 2/2012  | Habib et al. ................... 324/647 |
| 2012/0036198 | A1 | * | 2/2012  | Marzencki et al. ........... 709/206 |

* cited by examiner

*Primary Examiner* — Techane Gergiso
(74) *Attorney, Agent, or Firm* — Ferraiuoli LLC; Eugenio Torres

(57) ABSTRACT

An apparatus including an intrusion detection arrangement and a location identification arrangement which ties digital information (i.e. transaction events such as parameters of information, database queries, transaction ranges, etc.) submitted to a computer system with the physical characteristics of the event such as the picture of the person(s) originating the information.

20 Claims, 10 Drawing Sheets

| Computer name | Property Number | MAC Address | IP Address | Name of User | Index | Computer type (wired /wireless) |
|---|---|---|---|---|---|---|
|  |  |  |  |  |  |  |

FIG. 4

| Index | Computer Name | Property Number | MAC Address | IP Address | Name of User | Grid ID |
|---|---|---|---|---|---|---|
|  |  |  |  |  |  |  |

FIG. 5A

| Index | Grid ID | Average Signal Strength captured by AP 1 | Average Signal Strength captured by AP 2 | Average Signal Strength captured by AP 3 |
|---|---|---|---|---|
|  |  |  |  |  |

FIG. 5B

SIMULTANEOUS DETERMINATION OF A COMPUTER LOCATION AND USER IDENTIFICATION

STATEMENT REGARDING FEDERALLY SPONSORED RESEARCH AND DEVELOPMENT

N/A

RELATED APPLICATIONS

N/A

BACKGROUND OF THE INVENTION

1. Field of the Invention

The present invention relates generally to the field of security measures, more particularly to a network surveillance or computer intrusion detection system or extrusion detection wherein digital information is tied to physical characteristics of a given event.

2. Discussion of the Background

Network administrators are continuously searching for security measures in order to avoid intruders to gain unauthorized access to resources of the networks. A tendency of these intruders, also considered as attackers, is to position a wireless device in proximity of a wireless network to attempt to hack the wireless network in order to gain access to an internal network, or to gain free Internet access.

Further, some computer environments require more security than others. For example, banks, government institutions, and the like need to monitor computer systems for abnormalities in the transactions that take place within their networks. In addition, they need to maintain a perimeter within which confidential transactions take place and are monitored. This is critical for transactions generated by trusted users in a trusted computer system. Since trusted users have privileges that are not normally accessible to a normal user or even a computer intruder which would need the privileges of a trusted user to add, alter or delete data. To maintain order, the administrators of the system need to have numerous security measures in place to deter or, in the event of an incident, to react or collect information about the privileged information event.

FIG. 1 shows relevant art U.S. Pat. No. 5,557,742, incorporated herein as reference, disclosing an intrusion detection system (IDS). The intrusion detection system is limited to detecting the elements within the network and identifying the target system that originated the intrusion. This concept of intrusion detection is limited since there is no data that links the device to a user and the physical area.

Therefore, in the field of security, several procedures for detection are considered in order to prevent intruders from achieving their goal of not being properly identified in the course of their unauthorized activities. For example, some security measures are used for computer surveillance, usually including an intrusion detection system and physical location of computer system, with camera surveillance, which generally comprises camera systems and method for controlling servo mechanisms.

Several public documents discuss the use of camera surveillance incorporating motorized cameras, position encoding devices that can be applied to servos moving a tilt camera, optical encoders, motor controllers with integrated circuit and methods of controlling a motor, system for moving the camera to the desired location for robotic surveillance. For example, please see U.S. Pat. Nos. 6,830,388, 4,074,179, 4,491,776, 4,540,925, 4,319,134, 4,899,048, 6,081,091, 4,876,494, 4,925,312, and 6,882,901.

Further, for computer surveillance, several methods for wireless signal location have been proposed. For example see U.S. Application Publication No. 2003/0232598, U.S. Application Publication No. 2006/0281473 and U.S. Pat. No. 7,570,213.

The shortcomings of U.S. Patent Application Publication No. 2006/0281473 include the fact that it does not deal with the specific method of determining the location of the signal on instances where the location contains obstacles that may affect the readings in the signal's strength which may give a false identification of the signal location. It does not take into account the signal's fluctuations during the spurious events which may alter the signal's strength such as changes in the physical configuration of an office. In other words, it assumes a static and unchanging terrain of measurements that does not have obstacles.

U.S. Patent Application Publication No. 2003/0232598 is directed to the limitations in RSSI (Receive Signal Strength Indicator) measurements where there are "ambiguities and compensations for gain variations with frequency". This is a shortcoming in which most environments must deal with ambiguities and where there is no way to alter devices which do not belong to the administrator of an environment to compensate for the gain variations. Also one of said applications discloses that it is not necessary to determine absolute location or distance.

U.S. Pat. No. 7,570,213 tries to overcome these limitations by the addition of a clustering algorithm to compensate for the fluctuations in the signal's strength. This again falls short of solving the issue at hand, due to the clustering algorithm itself, which bases its discriminative power in a distance measure to cluster signals together. Sudden changes in signal strength profile (such as walking behind a wall or column or changes in the environment) may yield false positives that are not caught by the clustering algorithm.

Further, as previously mentioned, computer surveillance and camera surveillance tie the computer incident to the computer terminal from which the transaction originated and the person making the transaction. Such determination is necessary to trace the action to a particular user. An example of prior art which ties the computer incident to cameras is U.S. Patent Application Publication No. 2009/0125981.

U.S. Patent Application Publication No. 2009/0125981 has several shortcomings. The first shortcoming is that while it mentions that it supports wired communications, the specification is silent as to any means to support the location of wired devices. Another shortcoming is that the arrangement may pull a camera image with a notice which indicates that a potential network intrusion has been detected and security personnel may then manually move a camera. The current statement limits the system because security personnel must be available to move the camera and the system does not automatically operate to zoom in on a specific target. Said limitation is based on the method of detection of the signal in which as stated, the detection device is charged with identifying the general physical location.

Accordingly, there is a need in the art for a method which accurately identifies the intruder's and/or computer's physical location.

SUMMARY OF THE INVENTION

The invention's objective is to tie digital information (i.e. transaction events such as exact parameters of information, database queries, transaction ranges, etc.) submitted to a computer system with the physical characteristics of an event such as the picture of the person(s) submitting the information. The typical embodiment can be divided into several components to make its entirety:

Network surveillance, computer intrusion detection system or extrusion detection which basically refers to a method for detecting computer events and the capacity to analyze the same.

A method for physically locating the computers (desktop, laptops, PDA's, etc) such as the RSSI of a wireless signal or the means for detecting location such as time of signal travel. These readings belong to the network and convey information regarding different points in the delineated physical environment so that specific coordinates can be derived. Said coordinates will be stored in the intrusion detection system.

A calibration mapping system that stores the signal to locate information in a storage system. Further, the system stores static information of static computer systems such as servers and other computing systems as well as obstacles, such as walls and columns.

A supervised learning algorithm that learns expectations to average reading in the calibration mapping system and covers examples of extreme variations which the environment may provide.

A camera surveillance system to take the picture of the computer, triggering the rules in the intrusion detection system and the person or object at said terminal.

A servo system to move the cameras to the desired coordinates stored in the intrusion detection system.

A system to translate the desired coordinates to move the servo system to the desired coordinates.

An image processing system wherein any input image, such as a photograph or video frame, is compared against a stored image of the grid location. Using image processing techniques, the image processing system compares both images to see if a change in the scenery has occurred.

Another aspect of the preferred embodiment is to provide at least two different approaches to achieve the computer location and intruder identification. These two approaches are divided as follows:

Process for stationary terminals (desktop computers)
Process for non-stationary (i.e., nomadic) terminals (laptops, notebooks, tablet PC's, PDA's)

The main difference between the two processes is the coordinate determination within the physical boundaries of the network. The stationary terminal process carries the coordinate investigation prior to their activation on the network. The non-stationary or "nomadic" terminal process needs to determine the physical coordinates of the moving terminal in "real time".

According to one aspect of the preferred embodiment, a wireless intrusion detection arrangement and a location identification arrangement are provided, wherein the intrusion detection arrangement determines when an intruder, without authorization, attempts to access a wireless network of which the intrusion detection arrangement is a part. The location identification arrangement identifies at least a first approximate physical location of the intruder when the attacker attempts to access the wireless network. The location identification arrangement is configured to communicate the first approximated physical location to a surveillance arrangement which monitors the first approximate physical location. The images are processed to identify the "real time" physical location of the intruder.

The invention itself, both as to its configuration and its mode of operation will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more than one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The following drawings should be read with reference to the detailed description. Like numbers refer to like elements. The drawings, which are not necessarily to scale, illustratively depict embodiments of the present invention and are not intended to limit the scope of the invention.

FIGS. 4, 5A, and 5B show exemplary arrangements of the database for the intrusion detection system.

DESCRIPTION OF THE PREFERRED EMBODIMENT

Figure 2:
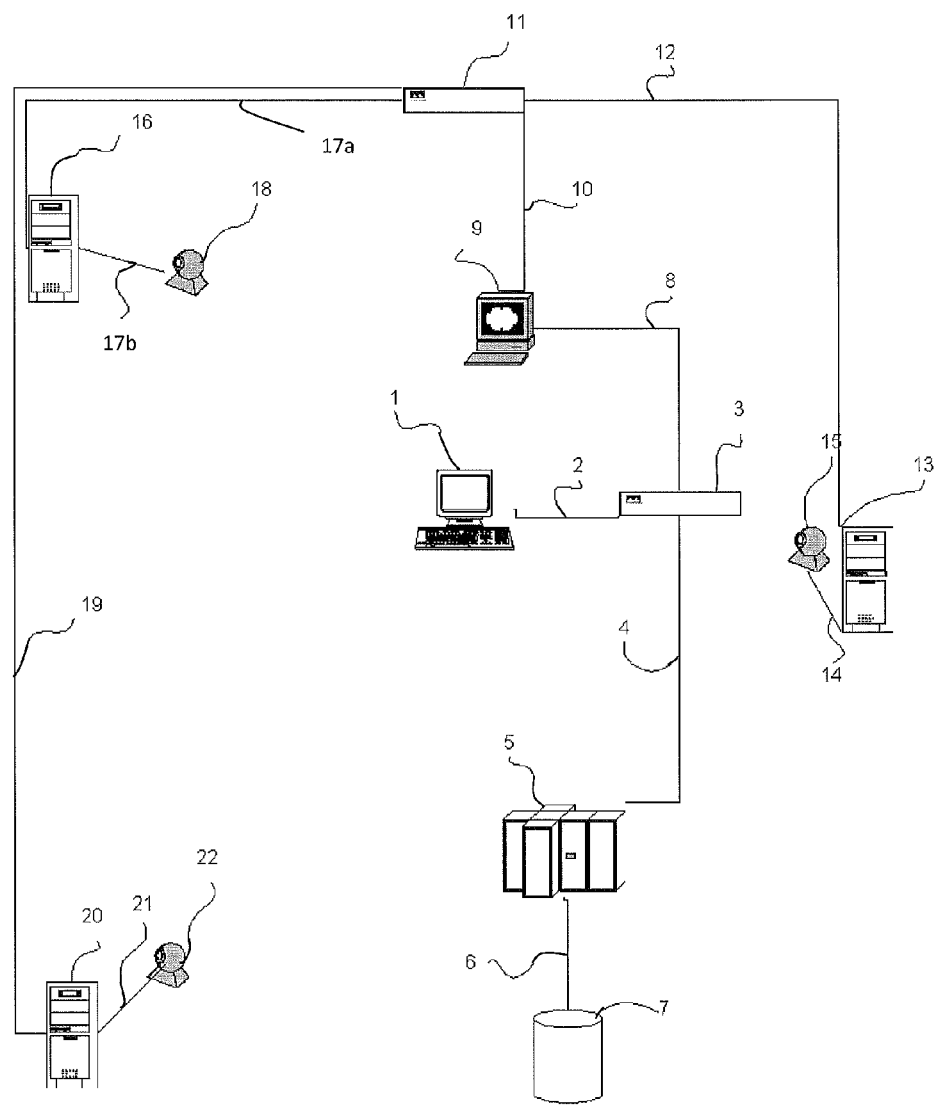
FIG. 2 shows a physically stationary terminal in a computer network, according to an embodiment of the present invention.

FIG. 2 discloses the first embodiment, which relates to a physically stationary terminal in the computer network. The stationary terminal comprises an intrusion detection device 9, switches 3, 11, computer system 1, cameral control devices and wireless signal generator 13, 16, 20, server 5, database 7, image collectors (i.e., dynamically-oriented imaging devices), such as cameras 18, 15, 22 and telecommunication cables, such as local area network cables 2, 4, 6, 8, 10, 12, 14, 17a, 17b, 19, 21 (which may include power cords, network cables such as Ethernet or any suitable connection known in the art or later developed).

Figure 3:
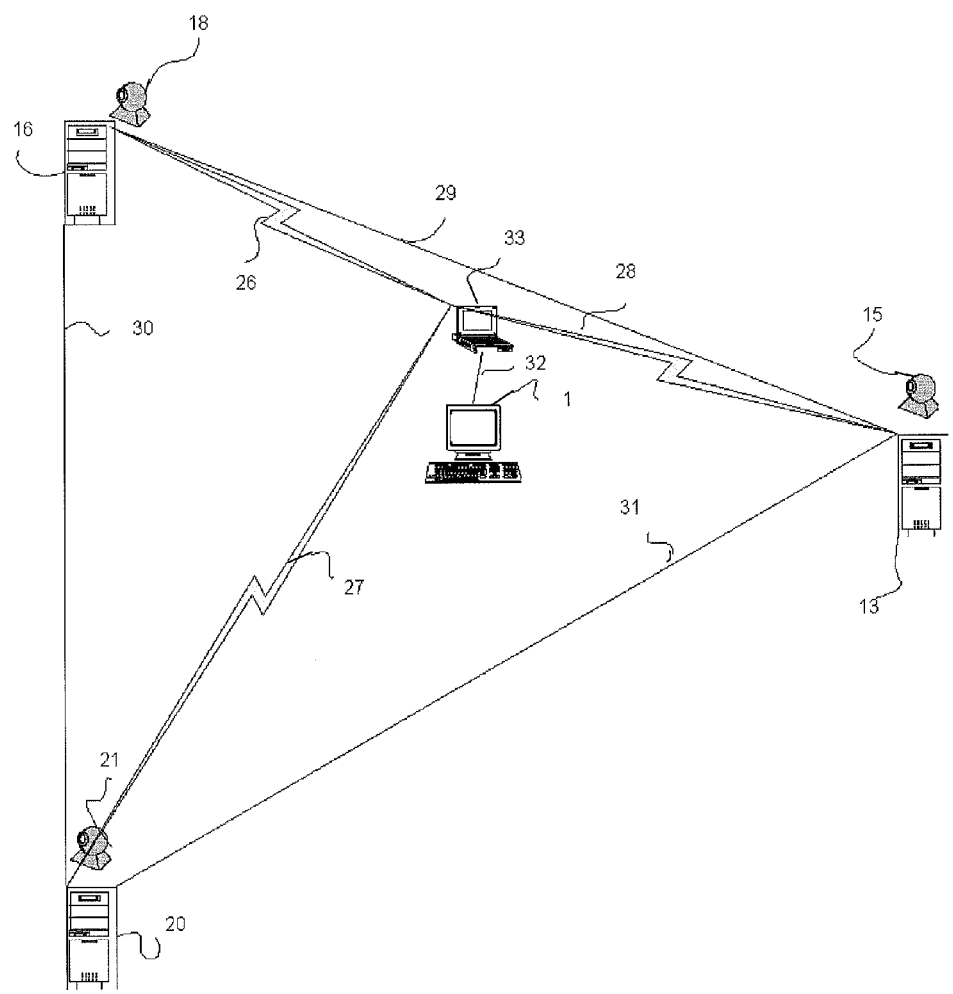
FIG. 3 shows a wireless non-stationary terminal in a computer network according to another embodiment of the invention.

FIG. 3 discloses the second embodiment which relates to a wireless non-stationary terminal in the computer network. The non-stationary terminal comprising a computer device 1, intrusion detection device 33, providing wireless signals 26, 27, 28, camera control devices and wireless signal generators 13, 16, 20, image collectors, such as cameras (i.e., dynamically-oriented imaging devices) 15, 18, 21 and telecommunications cables, such as local area network cables, 29, 30, 31, 32 (which may include network cables such as Ethernet or any suitable connector known in the art or later developed).

1. Preliminary Steps

The preliminary work is training the area or system in which a calibration mapping system or a digital map and a signal strength model of the local area now which is defined, for example as shown in FIG. 2 and FIG. 3. In the preferred embodiments, for both stationary and non-stationary terminals, the training is done within a delimited locale defined in the calibration mapping which has a set of wireless signal generators that can comprise the wireless network (ex. access points (Aps) IEEE 802.11 or "Bluetooth") in the delimited locale or physical user input device. The delimited locale does not imply small coverage area but just what is predefined to fall within the boundaries of the system. The wireless signal generators are segregated from the regular network for security purposes and will manage only the communications for the preferred first and second embodiment location functions.

An alternate set of wireless signal generators will provide communication for non-stationary devices. The access points that manage the location function, according to their position, will divide the area into spaces and store the information in the calibration mapping. Other extraneous elements such as obstacles can be stored in the calibration mapping. The calibration mapping will be carried out by sampling the signal at each of the grid points defined in the calibration map and storing values in a database using fields such as those shown in FIG. 4 through FIG. 5B. For example, the fields used for the storage of data may include Computer name, Property number, Media Access Control (MAC) address, Internet Protocol (IP) address, name of user, Index, Computer type, Grid TD, and related parameters. Alternate scenarios can be carried out by demonstrating physical changes to the environment and tagging such exceptions that a supervised learning algorithm such as a supervised neural network or other supervised learning algorithm can discriminate the different scenarios shown in the training set.

The process of using a supervised algorithm to discriminate physical changes consists of training the algorithm to handle exceptions, such as the redistribution of movable elements, within the confined space that is being monitored. The movable objects comprise, for example, office movable walls which may absorb signal's strength. The discriminate physical changes information is entered by sampling different configurations and storing the values in the database and training a supervised learning algorithm to discriminate the conditions of the signal strength under changing environmental conditions.

An additional step is to store a picture of the grid location such that it serves as the baseline for the imaging processing algorithm.

Figure 6A:
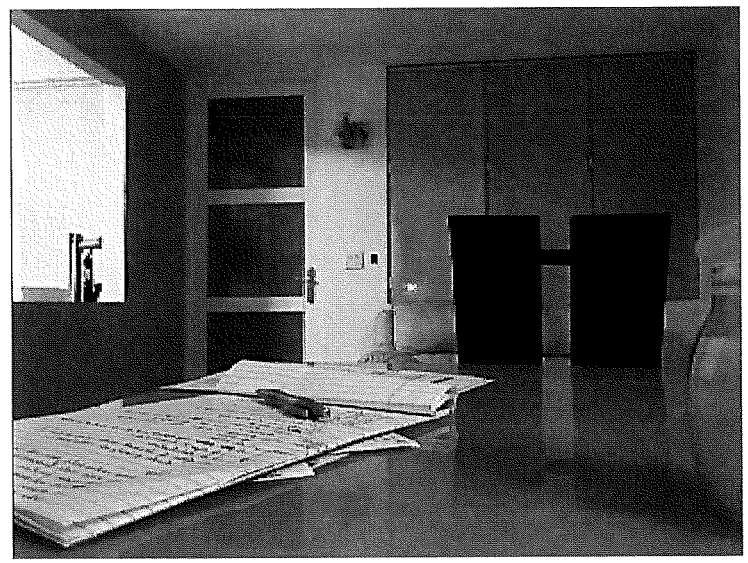
FIG. 6A shows an exemplary indoor scene which may be encoded according to another embodiment of the present invention
Figure 6B:
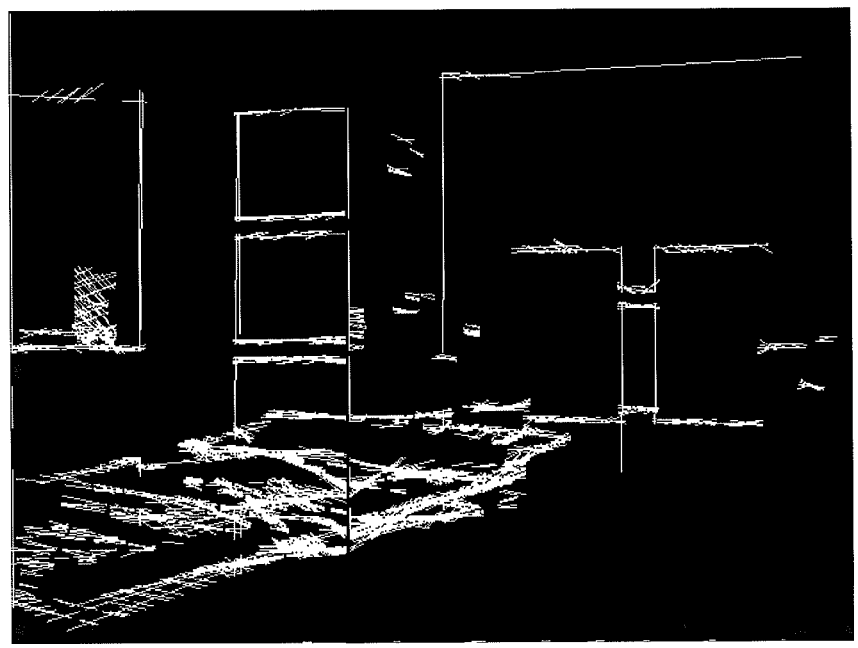
FIG. 6B shows a representation of the scenery in FIG. 6A using the Hough transform, according to an embodiment of the present invention.

A possible embodiment that demonstrates the image processing algorithm is that based on the assumption of the scene that is captured, an efficient image processing algorithm may be implemented. For example, most indoor spaces comprise linear boundaries. This information can be used to exploit an efficient image processing to encode the scenery and the changes to the scenery. Indoor scenery is shown in FIG. 6A. The figure shows that most elements are of linear nature. An efficient algorithm to represent such scenery is the Hough transform. The Hough transform is represented in FIG. 6B. The objective of the Hough transform, in this instance, is to identify the line segments that are in the image.

Figure 7:
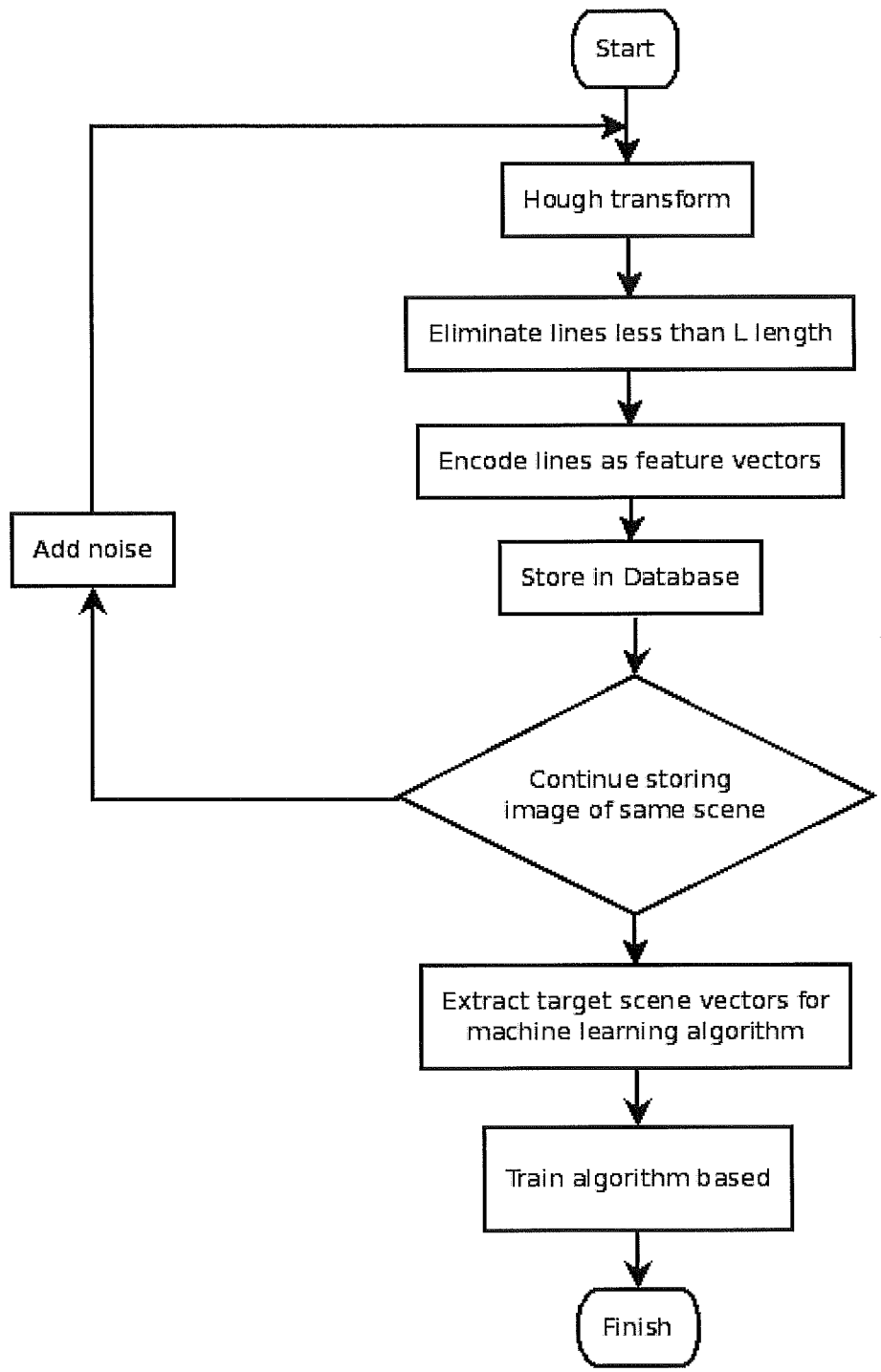
FIG. 7 shows the process of using the Hough transform according to yet another embodiment of the present invention.

The process of using the Hough transform for possible embodiments is shown in FIG. 7. The algorithm starts by taking the Hough transform of the image. The next step is to extract the size of the lines in pixels and determine the ratio of the size of the line to the total size of the image. If the lines are below certain threshold the line is eliminated. This eliminates possible background noise. The lines are encoded as feature vectors by using the start and endpoints of the lines. The line pixels are stored in order from left to right and top to bottom to maintain order of position in the image. The feature vectors will also include a tag in the vector, which in a possible embodiment may be the label of "changed" and "not changed." Another embodiment may be more granular as changed with the addition of a column, wall, or other structure. Both, the image and the feature vector are stored in the database. The image scenery can then be resampled with the addition of noise in the form of additional elements added to the scenes (i.e., movable walls, movable columns, or other movable structures), to add the desired noise (this noise implies changes to the environment and is distinguished from line noise which are lines that are not important and may confuse the supervised algorithm with unnecessary details of the scenery) to the image. Once the necessary images are taken and stored in the database, then the next stage of the process takes place which is the extraction of all relevant feature vectors for the scene are retrieved from the database to train the supervised learning algorithm. Possible embodiments for the supervised learning algorithm may include a neural network with two output nodes that classifies the scenery as "changed" and "not changed." The supervised learning algorithm is trained with the data and then the supervised algorithm can be used to detect future changes to the scenery. The scenery detection routine can then be periodically ran in which the cameras are activated to take an image at each sector and compare them to see if changes have occurred and if the scenery is changed then provide an alert to re-calibrate the system.

Figure 8:
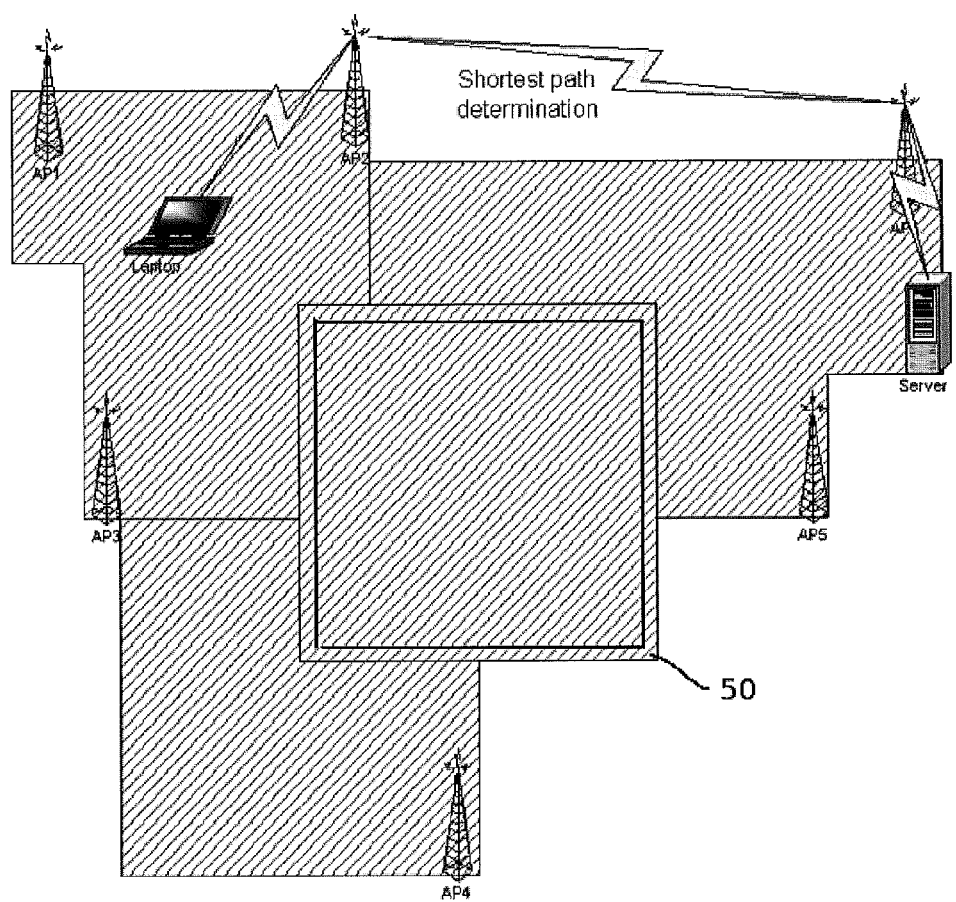
FIG. 8 shows tracking of a non-stationary source as the target for location.

Special sampling of the space is also done at the boundaries of the desired area as depicted in FIG. 8 in the delimitation area 50. Delimitation area 50 marks the boundary of the desired confinement sector where the computer system should reside. Said delimitation area 50 can also mark internal boundaries as well as external boundaries of space. If the user is detected at the boundary of the area of the grid the signal may be terminated or special warning to the system may be issued.

2. Physical Determination of the Stationary Terminal

The physical determination of the stationary terminal may consist of connecting a wireless enabled device to the stationary device (assumed to be a non-wireless device which is connected to a wired network, since if it is wireless-enabled it does not need the connected wireless enabled device) as in FIG. 2. Once the device is connected, the wireless device will communicate with the intrusion detection system and enter the relevant information as depicted in FIG. 4. The information will go into a database for the intrusion detection system 33. Once the information is stored, the system will sample the signals to determine the physical location of the stationary device. The information from the sampling signal is stored alongside the previously collected information as seen in FIG. 5B. While an alternative embodiment may include entering location coordinates manually into the database while assuming that the machine is a stationary device, tagging the device can compensate for re-positioning of stationary equipment.

The location will be determined as a function of received signal strength (e.g., RSSI) values gathered from the communications between the wireless device attached to the stationary device and the wireless signal generators. With a minimum of three wireless signal generators, trilateration can be used to determine the location of the stationary device within the respective delineated space as shown in FIG. 3. If the area of coverage is substantial and the devices have a high time resolution, an alternate embodiment to measure signal strength may consist of positioning servers at the same position as the access points. Instead of measuring signal strength, the alternate embodiment would include sending a "ping command" from a server located at the same position as the wireless signal generators to determine the time response from the stationary device to the server that controls the access point. At the same time determine the speed at which the signal traveled can be computed by $$v = \lambda f$$

Where the v is the velocity, lambda ($\lambda$) is wavelength and f is the frequency. From the velocity and time the distance from the "pinning" server to the stationary device can be determined. The same information may be stored in the same fashion as shown in FIG. 4 through 5B.

The alternate embodiment consists of having a non-stationary source as the target for location. When the rule is triggered from the intrusion detection system, the system will fetch the computer information and will start sensing the network for the location of the non-stationary device. This is done in real time since the target is moving along the delineated spaces. In order to track the non-stationary device in a big local area network (such as a building) the delineated space may take the form of localized spaces such as room x with N amount of access points as shown in FIG. 8 ($AP_1, AP_2, \ldots, AP_N$). To locate the non-stationary device in a designated localized space the system may sample all signal strength's from the devices. Alternatively the embodiment may use a "trace route" or similar process to help localize the non-stationary device by locating the AP's which are being used as transports for the communications and therefore localizing the closest camera.

3. Network Detection Setup

Figure 1:
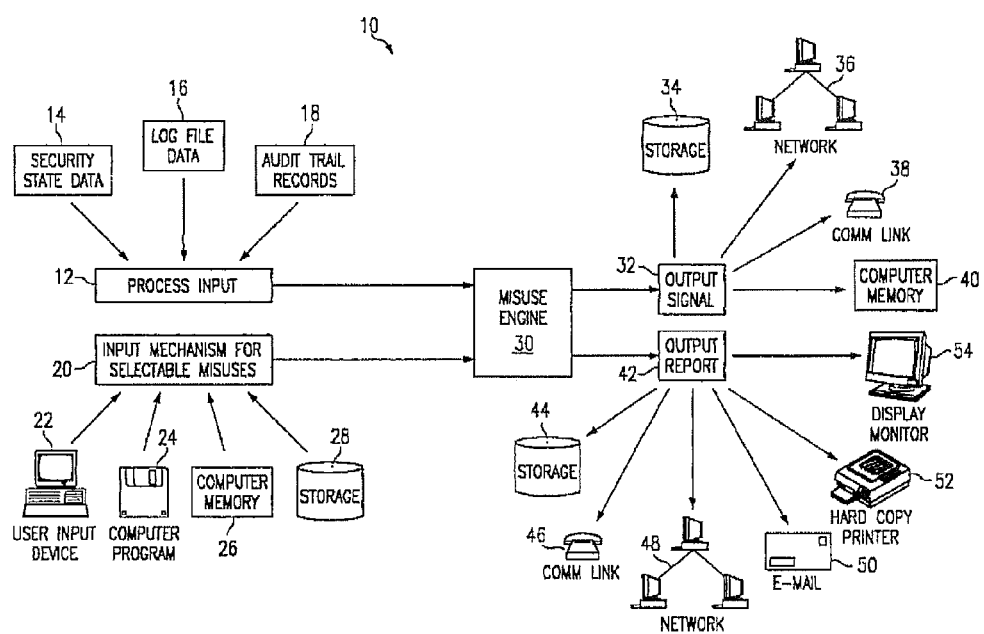
FIG. 1 shows an intrusion detection system (IDS) as described in U.S. Pat. No. 5,557,742.
Figure 9:
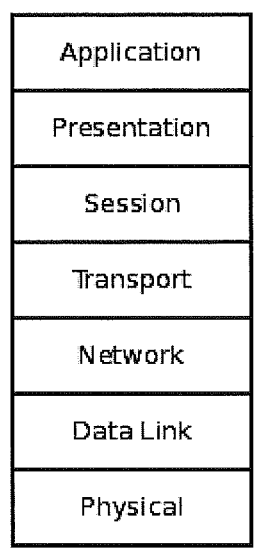
FIG. 9 shows Layer 7 of the OSI reference as application data which may be analyzed by the intrusion detection system of the present invention.

An intrusion detection system, as mentioned in FIG. 1 of U.S. Pat. No. 5,557,742, incorporated herein as reference, is limited to detecting elements within the network. The intrusion detection system in the present embodiment comprises a database 7 that contains the additional information pertaining to the individual stationary computers 13, 16, 20 as well as their physical location within the local area network. Additionally the intrusion detection system in the preferred embodiment may be capable of analyzing application data (Layer 7 of the OSI reference FIG. 9). An example of the preferred embodiment may include rule-based IDS or behavioral IDS which may be configurable to examine the payload (data) of the network traffic as it flows through the network. Another example would be host intrusion detection configured to send email alerts to a modified Network Intrusion Detection (NIDS) engine that passes the incoming data describing file changes. The preferred embodiment such as rule based NIDS can be configured on the basis of predefined rules. Such rules could be database (containing for example threshold rules to access information in an accounting database) access rules described at the data layer in hexadecimal code. Other examples of rules may be access to different computer resources on the network or host based intrusion detection programs sending the information to a centralized network intrusion detection system.

Figure 10:
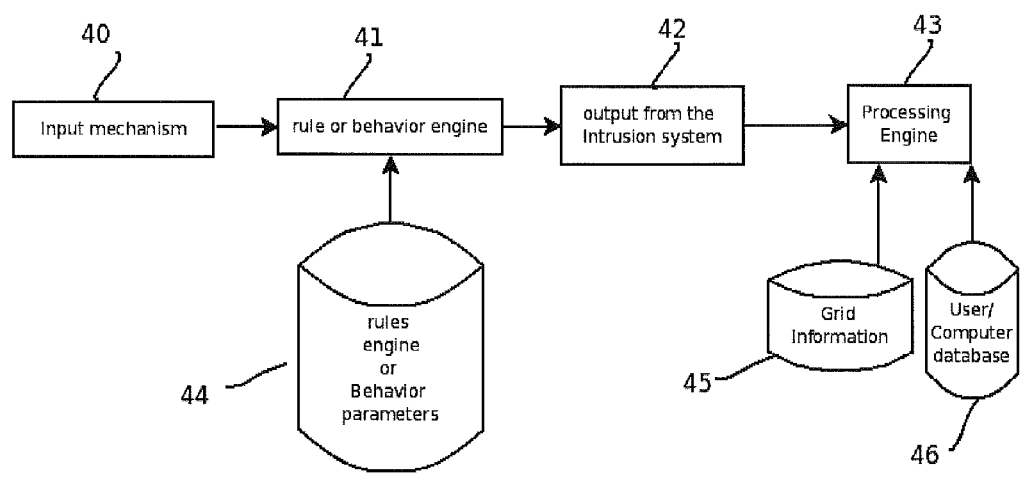
FIG. 10 shows an intrusion detection device according to the preferred embodiment of the present invention.

The preferred embodiment is shown in FIG. 10. FIG. 10 shows an IDS comprising an input mechanism 40. The input mechanism 40 may include a sniffer that is connected to the network and intercepts all traffic in the assigned network area. The desired positioning of the intrusion detection device should be located, as shown in FIG. 2, in the middle of the communication stream of the target system being compromised 5 and the originator of the attack (any user computer system 1). The input signal is sent to a processing engine such as behavioral or rule engine 41 (located in intrusion detection device 9) where the intercepted traffic is classified as either suspicious or not suspicious. The output of the IDS 42 is sent to a processing engine 43. Based on the IP information that it receives, the engine 43 matches the information database 46 that includes the table depicted in FIG. 4 though FIG. 5B. The information stored at the database 46 related to the table shown in FIG. 4 tells the system which user is accountable for the specified system that is in the alert. The alert collected by the input mechanism 40 comprises information such as IP address and MAC address may be used in the query match to the database. This information is also sent to the access point or LAN router where information is fetched from the telecommunications device to determine the location of the system.

4. Detection Process

Figure 11:
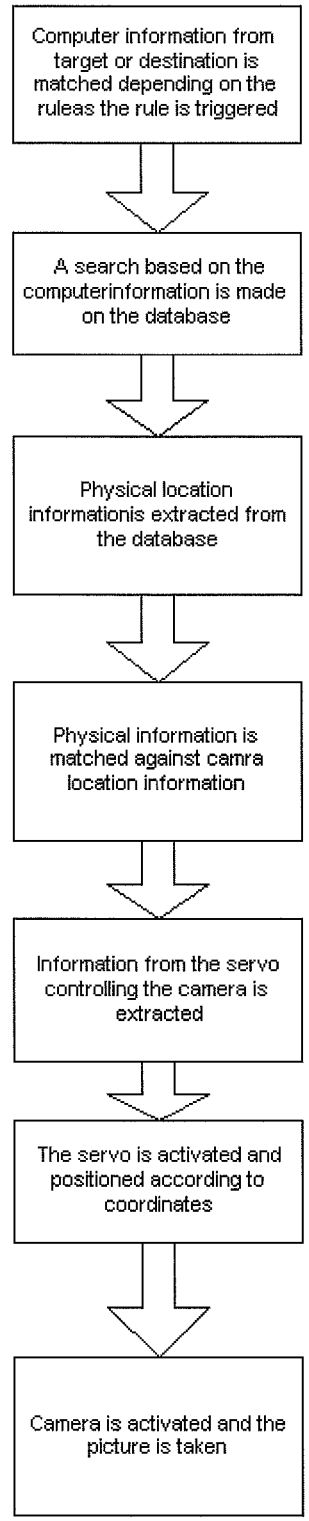
FIG. 11 shows a flow chart of the actual detection process.

The determination of the location is carried out depending on whether it is a wired line or wireless communication, according to the method shown in FIG. 11. The wired computer system is defined using computer type fields of table contained in FIG. 4. The information is fetched from the user database 46 of FIG. 10 and passed to the processing engine 43. The engine will then query database 46 for the table shown in FIG. 5A that depicts the static information of the wired computer. The system will then query the wireless device for its physical location. In the alternate embodiment, where the coordinates are entered manually on the system, the grid information's trustworthiness relies on the proper system configuration of the switching elements in which the computer is connected. Such switching elements 3 in FIG. 1 must not allow the user to be able to connect the computer cable to other physical switching drop locations.

For wireless systems, the computer is identified using the computer type field of the table contained in FIG. 4. The processing engine already has the wireless identification means through the IP information and the MAC address of the computer system. The system will query signal strength of such device from wireless signal generators 13, 16, 20 as shown in FIG. 3. The wireless signal generators will relay this information to the processing engine 43. The wireless signal generators will relay this information to the processing engine 43 which resides in the computer system 9 of FIG. 2. The system will then determine the location of the system by sampling consecutively from a plurality of wireless signal generators. The strength of the system will then be averaged and compared to the grid reading 45 stored in the database which stores the table shown in FIG. 5B. A measure of closeness will then determine the best match. Additionally the information will then be passed on to the supervised learning algorithm which will then use the input information image plus the information of its training to determine if the grid location has changed (which may cause a false positive) during the capture of an event. Both the measure of closeness and the output of the algorithm will be used to determine the final grid location on which the system resides and if the coordinates are reliable by validating that no change in the location has taken place.

An alternate embodiment contemplates sending a ping command from the access points to determine the time the signal took to get from the source machine to the destination machine and back. This process is then averaged and the time can then be compared to the mean values stored in the database and then use trilateration or a similar identification process to obtain the physical location of the signal.

If the processing engine is pre-configured to enforce boundary limitations (person is inside the grid) it will pull the access points periodically at a specified interval for all registered IPs in the system (for example the DHCP client database that holds all active IP's in the network)

5. Interface with Servo Controller and Camera

The physical location is matched against the closest camera(s) based on the physical location of the target and the camera list. Based on the location, camera type, lenses and other relevant information the system may need to adjust camera angles via a servo mechanism. If there is a servo mechanism for camera positioning, the preferred embodiment would fetch the camera servo mechanism based on the camera that was chosen from the camera list. The preferred embodiment would then adjust the camera servo mechanism via camera control devices and wireless signal generators 13, 16, 20 such that the camera's field of vision is directed to the coordinates of the stationary device. Once the camera's field of vision is directed at the physical coordinates of the stationary device, a picture is taken.

6. Image Processing to Corroborate that the Equipment is Choosing the Right Coordinates.

Due to the possibility that if an object is distorting the signal and a different grid detects the same signal strength the system can do an inverse calibration step. In the next step the calibration is made by taking signal samples at one specific point of the grid map. The training algorithm will be trained in case of noise. But this does not preclude the possibility of the grid location being modified by placing temporary walls (such as office spaces with cubicles) which may modify the signal's strength. The inverse calibration step consists of an image calibration of the location where a calibration picture is compared to the original stored image of the location. Both images may be threshold. This will create regions that may be tagged and then compared against the baseline picture. An additional step may be used by applying an edge detection technique and then using an algorithm such as the Hough transform to detect the boundaries of newly placed walls or other significant obstacles that may distort the signal. The equipment will then store the information and signal a significant modification to the locations so that new samples of the signal may be taken to re-calibrate the system. This new calibration may then be added to the learning algorithm so that it adjusts to the new parameters.

Additional Elements

The system is also capable of determining by means of tracking the location of the computer system if it falls within the predefined area of the grid. If the computing system falls outside the predefined boundaries of the grid, it can constitute as falling outside privilege boundary and may cease the communication link. This exception can be forced by the present embodiment even if it is within the boundaries of reception and transmission of the device in the perimeter. The preferred embodiments as they stand can be useful in detecting suspicious computer transactions and their originator. The preferred embodiment should not be taken as the only embodiment since the embodiment could also be complemented with biometrics and log files, among other things, in order to gather additional subject information. Other means of locating a computer in a closed environment like a local area network may involve the use of radio frequency identifiers. The system could also be integrated with motion sensors of conventional surveillance systems. The system could also be extended to track the user once it is acquired by the camera. Other uses would include open "hotspots" which intruders use as anonymous space to commit "digital vandalism".

The invention is not limited to the precise configurations described above. For example, while the embodiments have been described in terms of a network having stationary terminals or non-stationary (i.e., "nomadic") terminals, it is contemplated the scenario in which a network may incorporate both stationary and non-stationary (or nomadic) terminals. For example, in a given network, there may be a combination of stationary terminals (such as a desktop PC) and non-stationary terminals (such as a laptop employing a wireless connection). Furthermore, it is contemplated that the principles discussed herein for both stationary and non-stationary terminals are applicable to a network including both types of devices.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentably distinguish any amended claims from any applied prior art.

I claim:

1. A network security system, comprising:
    an intrusion detection device configured to detect suspicious network traffic based on predefined criteria;
    a plurality of wireless signal generators distributed across the network, wherein each said wireless signal generator is associated with a particular area within the network, wherein each said wireless signal generator produces a variable signal, the intensity of which is measured by the intrusion detection device and recorded in the database, wherein the intrusion detection device maps the intensity of each said signal with coordinates within each said particular area and wherein the intensity of each said signal with coordinates within each said particular area is recorded in the database;

a plurality of dynamically-oriented imaging devices, wherein each imaging device is configured to capture an image of the area associated with each wireless signal generator; and a database configured to store the predefined criteria and the images of each area, wherein the intrusion detection device retrieves an approximate location of an intruder device in response to the identification of a suspicious network traffic, wherein the approximate location is retrieved based on the coordinates recorded in the database; and wherein a dynamically-oriented imaging device located closest to the intruder device is activated and positioned to capture an image of said intruder device.

2. The network security system of claim 1, wherein the intrusion detection device is further configured to periodically map the intensity of each said signal to detect changes in the physical configuration of each particular area in response to variations in said intensity.

3. The network security system of claim 1, wherein the intrusion detection device identifies suspicious traffic by examining the payload portion of a message.

4. A wireless network security system, comprising:
an intrusion detection device configured to intercept wireless network traffic and detect suspicious activity based on predefined criteria;
a plurality of wireless signal generators distributed across the network, wherein each said wireless signal generator is associated with a particular area within the network, and wherein each said wireless signal generator produces a signal, the intensity of which is continuously measured by the intrusion detection device, wherein the intrusion detection device continuously maps the intensity of each said signal with coordinates within each said particular area and said mapping is recorded in the database;
a plurality of dynamically-oriented imaging devices, wherein each imaging device is configured to capture an image of the area associated with each said wireless signal generators, wherein a first image associated said particular area is recorded at the data base; and
a database configured to store the predefined criteria, the intensity of the measured signal and the images of each area,
wherein the intrusion detection device retrieves an approximate initial location of an intruder device in response to the identification of said wireless network traffic and detected suspicious activity based on predefined criteria,
wherein the approximate location is retrieved based on the coordinates recorded in the database; and
wherein a dynamically-oriented imaging device located closest to the intruder device is activated and positioned to capture an image of said intruder device.

5. The wireless network security system of claim 4, wherein the predefined criteria includes at least one of: a Computer Name, Property Number, MAC Address, IP Address, User Name, Index, and Computer Type.

6. The wireless network security system of claim 5, wherein the intrusion detection device identifies suspicious traffic by examining the payload portion of a message.

7. The wireless network security system of claim 4, wherein retrieving the approximate initial location comprises identifying at least one of said wireless signal generators previously used to channel the suspicious traffic.

8. The wireless network security system of claim 4, wherein the intrusion device retrieves the approximate initial location upon sampling all signal strengths from the plurality of wireless signal generators.

9. The wireless network security system of claim 4, wherein the approximate initial location is retrieved based on the coordinates recorded in the database.

10. The wireless network security system of claim 9, wherein the dynamically-oriented imaging device located closest to the intruder device is activated and positioned to capture an image of said intruder device.

11. A network security method, comprising:
distributing a plurality of wireless signal generators across the network, wherein each of said wireless signal generators is associated with a particular area within the network;
capturing a first image of the area associated with each of said wireless signal generators, wherein said capturing comprises activating at least one dynamically-oriented imaging device;
detecting suspicious network traffic based on predefined criteria; and
storing the predefined criteria and a first image and subsequent images of each area in a database, wherein each of said wireless signal generators produces a signal, the intensity of which is measured by an intrusion detection device and recorded in the database, mapping the intensity of each said signal with coordinates within each said particular area and recording the results in the database and periodically mapping the intensity of each said signal to detect changes in the physical configuration of each said particular area in response to variations in said intensity and variation between said first image and subsequent images,
further comprising retrieving an approximate location of an intruder device in response to the identification of a suspicious network traffic,
wherein retrieving the approximate location comprises fetching the coordinates recorded in the database and
further comprising activating and positioning the dynamically-oriented imaging device located closest to the intruder device based on the periodically mapping and changes in the physical configuration signal to capture an image of said intruder device.

12. The network security method of claim 11, further comprising periodically mapping the intensity of each said signal to detect changes in the physical configuration of each said particular area in response to variations in said intensity.

13. The network security method of claim 12, further comprising identifying suspicious traffic by examining the payload portion of a message.

14. The network security method of claim 13, further comprising retrieving an approximate location of an intruder device in response to the identification of said suspicious traffic.

15. The network security method of claim 14, wherein retrieving the approximate location comprises fetching the coordinates recorded in the database.

16. The network security method of claim 15, further comprising activating and positioning the dynamically-oriented imaging device located closest to the intruder device to capture an image of said intruder device.

17. The wireless network security method of claim 14, wherein retrieving the approximate initial location comprises identifying at least one of said wireless signal generator previously used to channel the suspicious traffic.

18. The network security method of claim 17, further comprising activating and positioning the dynamically-oriented imaging device located closest to the intruder device to capture an image of said intruder device.

19. The wireless network security method of claim 14, wherein retrieving the approximate initial location comprises sampling all signal strengths from the plurality of wireless signal generators.

20. The network security method of claim 19, further comprising activating and positioning the dynamically-oriented imaging device located closest to the intruder device to capture an image of said intruder device.

\* \* \* \* \*